United States Patent [19]

Kim et al.

[11] Patent Number: 5,723,070
[45] Date of Patent: Mar. 3, 1998

US005723070A

[54] PHOSPHOR FOR COLOR CATHODE RAY TUBE AND MANUFACTURING METHOD THEREOF

[75] Inventors: Min-ho Kim, Suwon; Bong-mo Jeong; Jae-ho Shim, both of Seoul; Wan-woo Park, Yongin; Deuk-yong Yang, Suwon, all of Rep. of Korea

[73] Assignee: Samsung Display Devices Co., Ltd., Kyungki-do, Rep. of Korea

[21] Appl. No.: 746,983

[22] Filed: Nov. 19, 1996

[30] Foreign Application Priority Data

Dec. 29, 1995 [KR]  Rep. of Korea ............... 95-66817

[51] Int. Cl.[6] .................................................. C09K 11/00
[52] U.S. Cl. .......................... 252/301.36; 252/301.4 R; 428/403; 427/212; 427/220

[58] Field of Search ............. 252/301.4 R, 301.36; 428/403; 427/212, 220

[56] References Cited

U.S. PATENT DOCUMENTS

| | | | |
|---|---|---|---|
| 3,993,838 | 11/1976 | Heytmeijer et al. | 427/221 |
| 5,043,265 | 8/1991 | Tanke et al. | 423/2.14 |

*Primary Examiner*—Melissa Bonner
*Attorney, Agent, or Firm*—Leydig, Voit & Mayer, Ltd.

[57] ABSTRACT

A phosphor for a color cathode ray tube (CRT) characterized in which the phosphor is coated with a charge regulator such as nigrosine or quaternary ammonium salt and manufacturing method thereof are provided. The phosphor according to the present invention can be positively charged to a level suitable for forming a fluorescent screen by an electrophotographic process.

6 Claims, No Drawings

5,723,070

PHOSPHOR FOR COLOR CATHODE RAY TUBE AND MANUFACTURING METHOD THEREOF

BACKGROUND OF THE INVENTION

The present invention relates to a phosphor for a color cathode ray tube (CRT) and manufacturing method thereof, and more particularly, to a phosphor being positively charged to a level suitable for forming a fluorescent screen by an electrophotographic process, and a manufacturing method thereof.

A red-emitting phosphor of europium-activated yttrium oxysulfide ($Y_2O_2S$:Eu), a green-emitting phosphor of copper and gold-activated aluminum-coactivated zinc sulfide (ZnS:Cu,Au,Al) or copper-activated aluminum-coactivated zinc sulfide (ZnS:Cu,Al), and a blue-emitting phosphor of silver-activated chloride-coactivated zinc sulfide (ZnS:Ag Cl) have been widely used as the phosphor constituents of the fluorescent screen of a color CRT.

The fluorescent screen has a dotted or striped pattern of red, green and blue-emitting phosphors interleaved between black matrix inside a panel. To form the phosphor pattern, first, a slurry is prepared which comprises red, green or blue-emitting phosphor, polyvinyl alcohol and potassium dichromate. Then, a panel on which a black matrix pattern is formed is coated with the obtained slurry. The thus-coated panel is dried, exposed to ultraviolet rays and developed, to form a pattern of phosphor. The other two phosphors are also applied to the panel in the same manner to complete the fluorescent screen.

The above method of forming a fluorescent screen using a phosphor slurry (hereinafter referred to as "slurry methods"), however, has problems. First, a color mixing problem arises when phosphor remaining on some non-exposed portions of the screen become mixed with the other phosphors. Second, a colored material can be generated by the reaction between hydroxy groups of polyvinyl alcohol and potassium dichromate contained in the florescent slurry, which degrades color purity. Third, the method is costly due to a lengthy production time and the potassium dichromate is a serious environmental pollutant.

To overcome these problems, a method of manufacturing a fluorescent screen exhibiting good contrast and brightness by using an electrophotographic technique has been proposed. Such a method should be different from the slurry method in many aspects and needs a greater variety of phosphor characteristics. About 20% of the generally used phosphors are negatively charged and charged amount thereof is not sufficient to be used in electrophotography.

SUMMARY OF THE INVENTION

Therefore, it is an object of present invention to provide a phosphor for a color CRT which can be positively charged to a great extent.

It is another object of the present invention to provide a manufacturing method for a color CRT phosphor which can be positively charged to a great extent.

To accomplish the above first object, there is provided a phosphor for a color CRT characterized in which the phosphor is coated with one charge regulator selected from the group consisting of nigrosine and quaternary ammonium salt.

To accomplish the above second object, there is provided a method of preparing a coated phosphor for a color CRT comprising the steps of: (a) adding a phosphor to a mixed solvent of water and organic solvent to form a phosphor slurry; (b) mixing a charge regulator selected from the group consisting of nigrosine and quaternary ammonium salt with the phosphor slurry; (c) adding a binder selected from the group consisting of potassium silicate and ethyl silicate to the mixture and maintaining the resultant at room temperature; and (d) removing water from the mixture obtained in step (c) and drying the resultant.

DETAILED DESCRIPTION OF THE INVENTION

The present invention is characterized by preparing a phosphor suitable for forming a fluorescent screen in an electrophotographic process by coating the phosphor with a charge regulator which can be positively charged.

Hereinafter, the characteristics of the present invention will be explained in detail, by reference to a method for preparing charge regulator-coated phosphors.

First, a phosphor is added to a mixed solvent and stirred to form a phosphor slurry. The mixed solvent is water and an organic solvent such as for example, methyl alcohol, ethyl alcohol, acetone or toluene, however the organic solvent used is not particularly limited. Preferably, the organic solvent is ethyl alcohol and the content of the organic solvent is below about 60% based on the total volume of the mixed solvent. If the amount of organic solvent is greater than about 60 vol.%, it is difficult to thereafter dissolve the charge regulator.

In the present invention, nigrosine or quaternary ammonium salt can be used as a charge regulator. Preferably, the charge regulator is pulverized to particles of 1 μm or below in diameter, using a grinder (e.g., a ball mill) and then added to the phosphor slurry. Here, the addition amount of the charge regulator is regulated such that the phosphor can be sufficiently endowed with a positively-charged characteristic, without having an adverse effect on the emission characteristics of the phosphor. Therefore, the content of nigrosine or quaternary ammonium salt is preferably 0.1 to about 3.0 wt % based on the weight of phosphor.

According to the present invention, potassium silicate or ethyl silicate, optionally together with zinc sulfate or aluminum nitrate, is added to the mixture of the phosphor slurry and the charge regulator, and the mixture is maintained at pH 5 to pH 8 for thirty minutes to one hour, in order to adhere the charge regulator to the surfaces of the phosphor particles. After eliminating water from the mixture and drying, phosphors coated with the charge regulator can be obtained. The charge regulator coating the phosphor may have a mean particle diameter not more than 1 μm and is about 0.1 to about 10 wt % based on the total weight of the phosphor.

Preferably, a potassium silicate solution as a binder contains about 0.01 to about 2.0 wt % of silicon oxide. Here, weak adhesion of the charge regulator to the phosphor's surface results in cases below 0.01wt % of silicon oxide, and the phosphor particles cohere to each other in cases above 2.0wt % of silicon oxide, so that fluidity and brightness of the phosphor are lowered.

Hereinafter, the present invention will be explained with reference to following examples, but the scope of the present invention is not limited thereto.

EXAMPLE 1

Silver-activated, chlorine co-activated zinc sulfide (ZnS:Ag Cl) as a blue-emitting phosphor is put into a mixed solvent consisting of 2 l of pure water and 1 l of ethyl alcohol and then stirred. Quaternary ammonium salt (BONTRON P-51) as a charge regulator is put into a ball mill, pulverized, and then added to the prepared mixture. Here 20 ml of potassium silicate solution (containing 1 wt % of $SiO_2$) and 22.5 ml of 2% zinc sulfate solution are added thereto and then $1N-NH_4OH$ is added to adjust the pH at about 6. The reaction mixture is maintained for one hour at that pH, removed of water, dried for ten hours at 40° C. and then passed through a sieve (400 mesh), so blue-emitting phosphor coated with the charge regulator was prepared.

The obtained phosphor is characterized in that the content of negatively charged phosphor is very low to an extent of 1% or below, charge amount per unit mass and charge density thereof are 5.7 μC/g and 3.5fC/10 μm, respectively.

EXAMPLE 2

Except using a green-emitting phosphor of copper and gold-activated, aluminum co-activated zinc sulfide (ZnS: Cu, Au, Al) instead of the blue-emitting phosphor, a phosphor coated with a charge regulator was prepared in the same manner as described in Example 1.

The obtained phosphor is characterized in that negatively charged phosphor is 1% or below, charge amount per unit mass and charge density thereof are 4.8 μC/g and 2.0fC/10 μm, respectively.

EXAMPLE 3

Except using a red-emitting phosphor of europium-activated yttrium oxysulfide ($Y_2O_2S$:Eu) instead of the blue phosphor, a phosphor coated with a charge regulator was prepared in the same manner as described in Example 2.

The obtained phosphor is characterized in that negatively charged phosphor is 1% or below, charge amount per unit mass and charge density thereof are 8.6 μC/g and 2.3fC/10 μm, respectively.

Comparative Examples

For comparison, charge amount per unit mass and charge density for ZnS:Ag,Cl, ZnS:Cu,Au,Al and Y202S:Eu as blue-, green- and red-emitting phosphor, respectively, without charge regulator coating on their surface are estimated and the results are shown in the following table.

| phosphor | before coating | after coating |
|---|---|---|
| ZnS:Ag,Cl | −8.7 μC/g | 5.7 μC/g |
| | 0.9 fC/10 μm | 3.5 fC/10 μm |
| ZnS:Cu,Au,Al | 0.1 μC/g | 4.8 μC/g |
| | 0.7 fC/10 μm | 2.0 fC/10 μm |

-continued

| phosphor | before coating | after coating |
|---|---|---|
| $Y_2O_2S$:Eu | −19.0 μC/g | 8.6 μC/g |
| | 0.7 fC/10 μm | 2.3 fC/10 μm |

As shown in the above table, uncoated phosphors are negatively charged or, even if positively charged, charge density and the ratio of charge to mass are very low compared with those of the coated phosphors.

As above, a phosphor coated with charge regulator according to the present invention can be positively charged to a level suitable for forming a fluorescent screen by an electrophotographic process.

What is claimed is:

1. A phosphor for a color CRT wherein said phosphor is coated with a charge regulator selected from the group consisting of nigrosine and quaternary ammonium salt, wherein said charge regulator has a mean particle diameter not more than 1 μm and is about 0.01 to about 10.0 wt % based on the total weight of said phosphor.

2. A method of manufacturing a phosphor for a color CRT comprising the steps of:

(a) adding a phosphor to a mixture of water and organic solvent to form a phosphor slurry;

(b) mixing said phosphor slurry with a charge regulator selected from the group consisting of nigrosine and quaternary ammonium salt;

(c) adding a binder selected from the group consisting of potassium silicate and ethyl silicate to said mixture and maintaining the resultant at a pH of 5 to 8 at room temperature; and (d) removing water from and drying the resultant.

3. The method of manufacturing a phosphor for a color CRT according to claim 2, wherein the content of said charge regulator is about 0.1 to about 3.0 wt % based on the total weight of said phosphor.

4. The method of manufacturing a phosphor for a color CRT according to claim 2, wherein said charge regulator has a mean particle diameter not more than 1 μm.

5. A phosphor for a color CRT wherein said phosphor is coated with a charge regulator comprising nigrosine.

6. The phosphor for a color CRT according to claim 5, wherein said charge regulator has a mean particle diameter not more than 1 μm and is about 0.1 to about 10.0 wt % based on the total weight of said phosphor.

* * * * *